United States Patent
Grosse et al.

(10) Patent No.: US 11,691,492 B2
(45) Date of Patent: Jul. 4, 2023

(54) ASSEMBLY FOR SECURING A VEHICLE BATTERY ON A BODY OF A MOTOR VEHICLE, AND METHOD FOR MOUNTING A VEHICLE BATTERY IN A MOTOR VEHICLE

(71) Applicant: Bayerische Motoren Werke Aktiengesellschaft, Munich (DE)

(72) Inventors: Ronny Grosse, Eichenau (DE); Michael Nordhoff, Engden (DE); Martin Schuster, Munich (DE); Martin Spaeth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 610 days.

(21) Appl. No.: 16/576,917

(22) Filed: Sep. 20, 2019

(65) Prior Publication Data
US 2020/0009957 A1  Jan. 9, 2020

Related U.S. Application Data

(63) Continuation of application No. PCT/EP2018/059753, filed on Apr. 17, 2018.

(30) Foreign Application Priority Data

Apr. 20, 2017 (DE) .............. 10 2017 206 650.4

(51) Int. Cl.
*B60K 1/04* (2019.01)
*H01M 50/262* (2021.01)

(52) U.S. Cl.
CPC ............ *B60K 1/04* (2013.01); *H01M 50/262* (2021.01); *H01M 2220/20* (2013.01)

(58) Field of Classification Search
None
See application file for complete search history.

(56) References Cited

U.S. PATENT DOCUMENTS

| | | |
|---|---|---|
| 8,336,658 B2 | 12/2012 | Rawlinson et al. |
| 9,517,686 B1 | 12/2016 | Paramasivam et al. |
| 2009/0145676 A1 | 6/2009 | Takasaki et al. |
| 2012/0217077 A1 | 8/2012 | Ojima et al. |

(Continued)

FOREIGN PATENT DOCUMENTS

| | | |
|---|---|---|
| CN | 101450605 A | 6/2009 |
| CN | 101890941 A | 11/2010 |

(Continued)

OTHER PUBLICATIONS

English translation of Chinese Office Action issued in Chinese Application No. 201880010333.9 dated Dec. 6, 2021 (11 pages).

(Continued)

*Primary Examiner* — Carmen V Lyles-Irving
(74) *Attorney, Agent, or Firm* — Crowell & Moring LLP

(57) ABSTRACT

A securing assembly secures a vehicle battery on a vehicle body, and includes a securing element for securing to a housing of the vehicle battery and a securing unit for detachably securing to a body part of the vehicle body. The securing element and the securing unit are configured so as to be integrally, interlockingly or force-lockingly connected to one another when bringing the vehicle battery into a mounting position.

15 Claims, 4 Drawing Sheets

(56) References Cited

U.S. PATENT DOCUMENTS

| | | |
|---|---|---|
| 2012/0255800 A1 | 10/2012 | Lejeune et al. |
| 2013/0180791 A1* | 7/2013 | Lejeune .................. B60K 1/04 |
| | | 180/68.5 |
| 2014/0326524 A1 | 11/2014 | Ogushi et al. |
| 2015/0151624 A1 | 6/2015 | Yamada et al. |
| 2016/0114667 A1* | 4/2016 | Ikeda .................... H01M 50/24 |
| | | 180/68.5 |
| 2017/0021740 A1 | 1/2017 | Brendecke et al. |
| 2017/0047563 A1 | 2/2017 | Lee et al. |
| 2017/0054120 A1* | 2/2017 | Templeman .......... H01M 50/20 |
| 2018/0123102 A1* | 5/2018 | Lomax .................. H01M 50/20 |
| 2020/0259142 A1 | 8/2020 | Yin et al. |

FOREIGN PATENT DOCUMENTS

| | | | |
|---|---|---|---|
| CN | 103108762 | A | 5/2013 |
| CN | 103958242 | A | 7/2014 |
| CN | 104701473 | A | 6/2015 |
| CN | 105098112 | A | 11/2015 |
| CN | 106058109 | A | 10/2016 |
| CN | 106080203 | A | 11/2016 |
| CN | 106364299 | A | 2/2017 |
| CN | 106476770 | A | 3/2017 |
| CN | 106494207 | A | 3/2017 |
| DE | 10 2005 017 303 | A1 | 10/2006 |
| DE | 10 2009 034 698 | A1 | 1/2011 |
| DE | 10 2009 052 525 | A1 | 5/2011 |
| DE | 10 2010 056 381 | A1 | 6/2012 |
| DE | 10 2011 004 839 | A1 | 8/2012 |
| DE | 10 2011 082 576 | A1 | 3/2013 |
| DE | 10 2012 202 164 | A1 | 8/2013 |
| DE | 10 2013 221 134 | A1 | 4/2015 |
| DE | 11 2014 002 554 | T5 | 3/2016 |
| DE | 10 2015 008 727 | A1 | 1/2017 |
| EP | 3 088 751 | A1 | 11/2016 |
| FR | 2 954 594 | A | 6/2011 |
| FR | 2 962 943 | A1 | 1/2012 |

OTHER PUBLICATIONS

International Search Report (PCT/ISA/210) issued in PCT Application No. PCT/EP2018/059753 dated Jul. 30, 2018 with English translation (six (6) pages).

German-language Written Opinion (PCT/ISA/237) issued in PCT Application No. PCT/EP2018/059753 dated Jul. 30, 2018 with English translation (six (6) pages).

German-language Search Report issued in counterpart German Application No. 102017206650.4 dated Dec. 11, 2017 with partial English translation (12 pages).

* cited by examiner

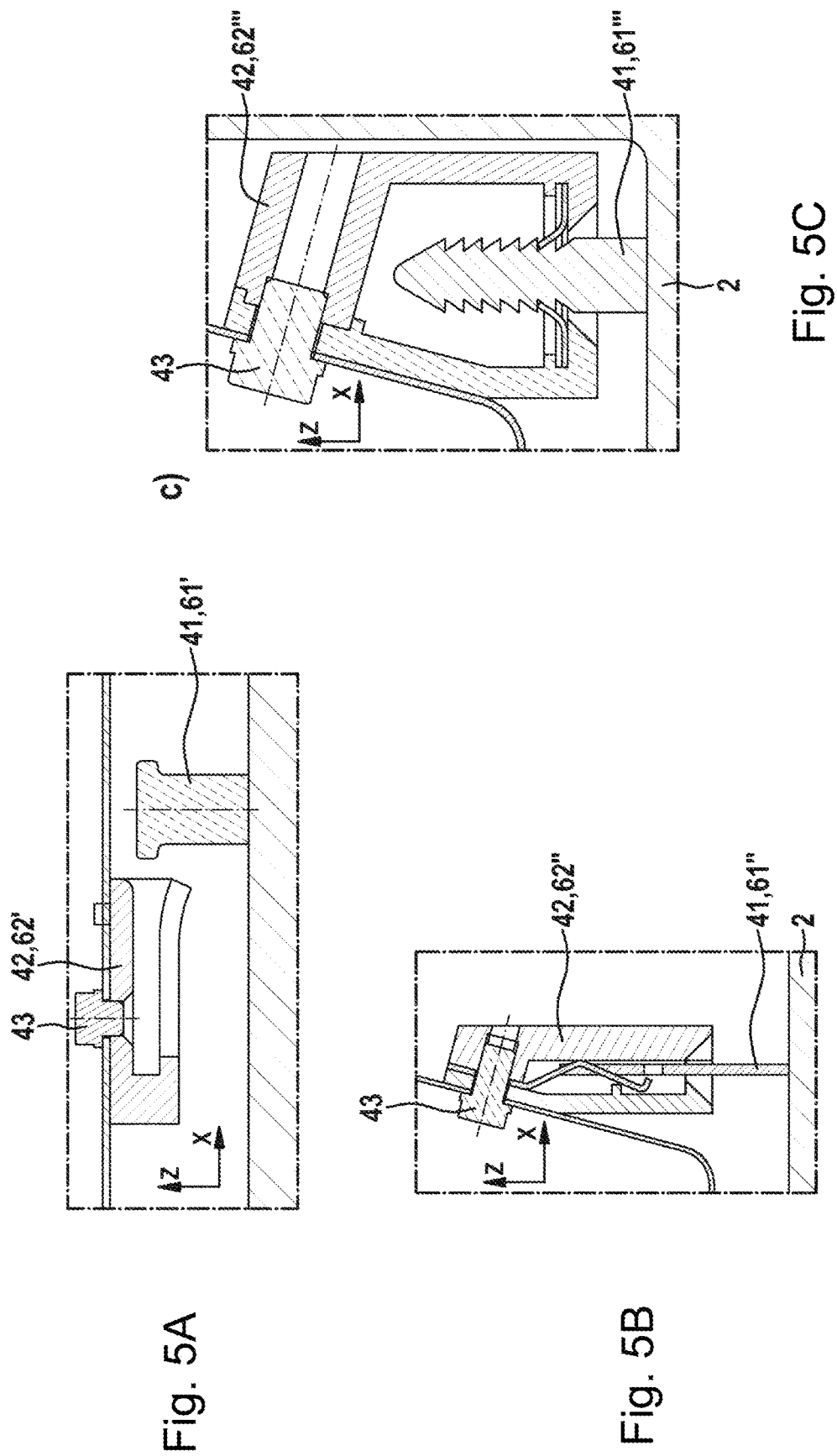

ASSEMBLY FOR SECURING A VEHICLE BATTERY ON A BODY OF A MOTOR VEHICLE, AND METHOD FOR MOUNTING A VEHICLE BATTERY IN A MOTOR VEHICLE

CROSS REFERENCE TO RELATED APPLICATIONS

This application is a continuation of PCT International Application No. PCT/EP2018/059753, filed Apr. 17, 2018, which claims priority under 35 U.S.C. § 119 from German Patent Application No. 10 2017 206 650.4, filed Apr. 20, 2017, the entire disclosures of which are herein expressly incorporated by reference.

BACKGROUND AND SUMMARY OF THE INVENTION

The invention relates to electrically operated motor vehicles, and especially motor vehicles with vehicle batteries for the traction drive. Furthermore, the present invention relates to measures and devices for securing the vehicle battery to a body of a motor vehicle.

Electrically operated motor vehicles generally require a vehicle battery as an electrical energy accumulator for the traction. The vehicle battery, due to the required capacity, has large structural dimensions and a heavy weight and therefore it is often secured to the underbody of the vehicle body beneath the passenger compartment. Due to the compactness of traditional vehicle batteries, these often also make a contribution to the mechanical stabilization of the frame of the vehicle body between front axle and rear axle.

Since the vehicle battery is arranged beneath the passenger compartment, the height of the vehicle battery is limited for comfort reasons. Due to the large volume of the battery cells, such a vehicle battery extends in the lateral direction almost across the entire vehicle width and the distance between the front axle and the rear axle.

The vehicle battery has an encircling securing flange for its securing to the vehicle body, with which the vehicle battery is screwed to the underbody of the vehicle body or otherwise secured. However, such an arrangement of the vehicle battery may result in low-frequency vibrations during the operation of the motor vehicle on account of its heavy weight and its two-dimensional extension, which may be perceived as being unpleasant. A common solution for avoiding such vibrations is a securing of the vehicle battery to the vehicle body via its housing cover.

U.S. Pat. No. 8,336,658 B2 discloses a vehicle battery with interior continuous openings passing through the accumulator volume. A securing of the vehicle battery is accomplished by screws set into the continuous openings. However, such continuous openings represent weak points of the housing of the vehicle battery, which can only be sealed off against the penetration of dirt or moisture with very large expense. Often such a solution is not age resistant or corrosion resistant.

Due to the arrangement and structural height of the vehicle body, generally reinforcing structures are reduced in the floor area of the vehicle body. The reduced rigidity of the vehicle body may result in low-frequency vibrations, which may be further intensified by components which are able to vibrate.

Furthermore, the problem exists that there is no access to the passenger compartment during the initial assembly of the motor vehicle, or access is only possible by disturbing the manufacturing process, with the result that the securing of the vehicle battery with the top side of its housing against the beam of the vehicle body is not readily possible. Furthermore, it must be possible to easily release the vehicle battery from the body after its first installation for purposes of its replacement or servicing.

One problem which the present invention proposes to solve is to provide a better securing possibility for a vehicle battery, with which the vehicle battery can also be secured to the body by one side of the housing and without a flange. The securing should be such that no work step is needed during the initial assembly to mount the vehicle battery on the vehicle body through the interior of the passenger compartment, although a later removal for servicing or replacement is possible.

This problem is solved by the securing assembly for a vehicle battery in a motor vehicle, a body arrangement of a motor vehicle, and a method for mounting and removing a vehicle battery in a motor vehicle, according to the claimed invention.

According to a first aspect, a securing assembly for securing a vehicle battery on a body of a vehicle is provided, comprising: a securing element for securing to a housing of the vehicle battery; and a securing device for detachably securing to a body part of the vehicle body, wherein the securing element and the securing device are configured such that they can be connected to one another by material bonding, form fitting, or force locking when the vehicle battery is placed in a mounting position.

According to a further aspect, a method is provided for mounting a vehicle battery on a vehicle body, having the following steps: detachable securing of a securing device to a body part of the vehicle body; securing of a securing element to a housing of the vehicle battery; and positioning of the vehicle battery in a mounting position on the vehicle body, wherein the securing element is permanently connected to the securing device.

One way of designing the above securing assembly is to provide a securing element which is detachably secured prior to the initial assembly of the vehicle battery on the vehicle body. Furthermore, the battery housing is provided with a securing device. The securing element and the securing device are designed such that they enable a connection of the vehicle battery to the vehicle body by material bonding, form fitting, or force locking. The connection of the vehicle battery to the vehicle body occurs in this case by a simple mounting of the vehicle battery on the vehicle body, the vehicle battery being moved to the position on the vehicle body. Once the vehicle battery is in its mounting position, the securing element and the securing device together form a permanent, not readily releasable and load bearing connection. Thus, when the vehicle battery is inserted into its mounting position, a connection between the securing element and the securing device, and thus between the vehicle body and the housing of the vehicle battery, is produced without further action.

For example, the vehicle battery can be placed in the mounting position by screwing the vehicle battery to the vehicle body along the securing flange at the housing rim of the vehicle battery. By tightening up the screw connections of the vehicle battery to the vehicle body, the securing device is pressed against the securing element, and this produces the connection between the securing element and the securing device.

If the vehicle battery is intended to be taken out from the vehicle body, it is provided to loosen the securing element which is detachably mounted on the vehicle body by an intervention from the interior of the passenger compartment. Prior to the initial assembly of the vehicle battery on the vehicle body, the securing element is detachably secured from the passenger compartment, and after the initial assembly the possibility exists of again loosening the vehicle battery from the vehicle body.

In this way, a securing assembly can be created which enables an initial assembly without access to the passenger compartment. After the initial assembly, the securing assembly is detachable, since it is connected in particular by the releasable connection to the vehicle body.

In particular, the connecting device for connecting the securing device to the securing element may be an adhesive bond, which provides a tolerance compensation for the positioning of the vehicle battery in an especially simple manner.

On the whole, such a securing assembly enables an especially simple initial assembly without having to provide substantial design space for the securing assembly.

Furthermore, a connecting device in the form of an adhesive may be introduced between the securing element and the securing device.

In particular, the securing element, which is designed in the form of a securing plate, can have a continuous opening to receive a screw connection.

Furthermore, it may be provided that the adhesive of the connecting device fully surrounds the continuous opening. In this way, a screw can be kept dry by the continuous opening and furthermore a releasing of the screw is possible.

According to one embodiment, the securing device may have an encircling rim protruding in the direction of the securing element on the side where the adhesive is applied. In this way, the nonhardened adhesive can be prevented from emerging or flowing out from the securing device onto the vehicle body.

Furthermore, the securing element may be provided with a locking element and the securing device may be provided with a locking device, which interlock with each other.

According to one embodiment, the securing device may have a device for a screw connection with the vehicle body, especially a threaded hole. This can make it possible to loosen the vehicle battery with the attached securing assembly from the passenger compartment of the vehicle body.

According to another aspect, a body arrangement is provided with a vehicle body, with a vehicle battery and with the above securing assembly, which are arranged between a housing side of the vehicle battery and a body part of the vehicle body, wherein the securing assembly is formed such that, when the vehicle battery is placed in a mounting position on the vehicle body, the securing element is permanently connected to the securing device.

Furthermore, the securing device can be releasably connected to the body part of the vehicle body and the securing element can be connected to the housing side of the vehicle battery.

According to one embodiment, the securing element can be connected by a screw connection to a stiffening profile of the vehicle battery.

It may be provided that the securing device is connected by a screw connection to the body part of the vehicle body, and the screw connection is releasable from the passenger compartment of the vehicle body.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 5A to 5C show further connecting devices for a form-fitting connection between securing element and securing device.

DETAILED DESCRIPTION OF THE DRAWINGS

Figure 1:
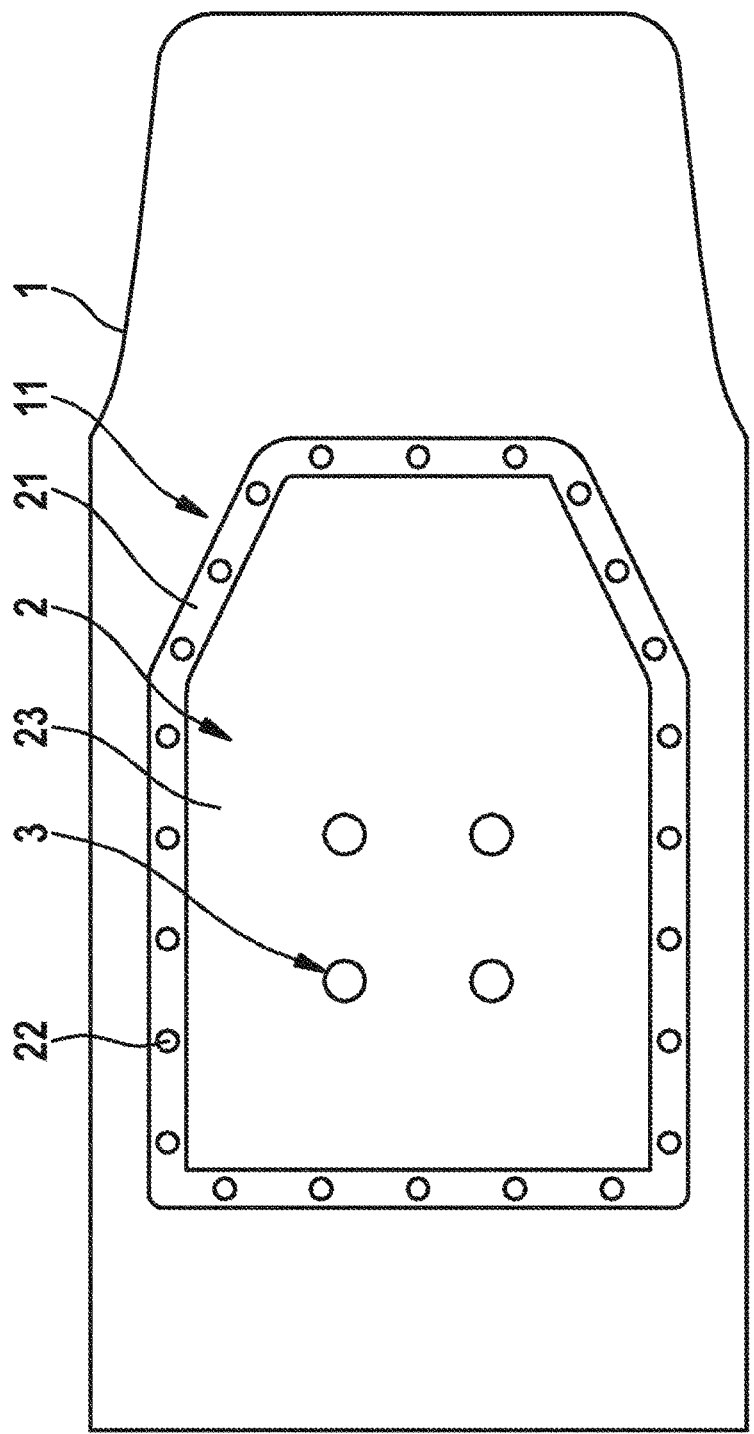
FIG. 1 is a bottom view of a vehicle body with a vehicle battery mounted.

FIG. 1 is a view of a vehicle body 1 of a motor vehicle with mounted vehicle battery 2, shown from below. The vehicle body 1 having a cavity 11 in order to receive the vehicle battery 2 can be seen. The vehicle battery 2 is designed with a thickness between 10 and 30 cm and therefore has lateral dimensions which occupy a major portion of the length between the positions of the front axle and rear axle of the motor vehicle and a major portion of the width of the vehicle body 1.

The vehicle battery 2 has an entirely or partly encircling securing flange 21, which surrounds the housing of the vehicle battery 2 on its side (lateral face). By the securing flange 21, the vehicle battery 2 can be connected with the aid of releasable connections, especially by screw connections 22, to the vehicle body 1. In order to avoid vibrations, it is now provided to have a fixation between a body part 12 (see FIG. 2) in the cavity 11 of the vehicle body 1 and a housing side 23 (the side perpendicular to the thickness direction) of the vehicle battery 2, so that it is possible to avoid a back swinging of the vehicle battery 2 or the body part of the vehicle body 1 in a region which is surrounded by the securing flange 21.

Figure 2:
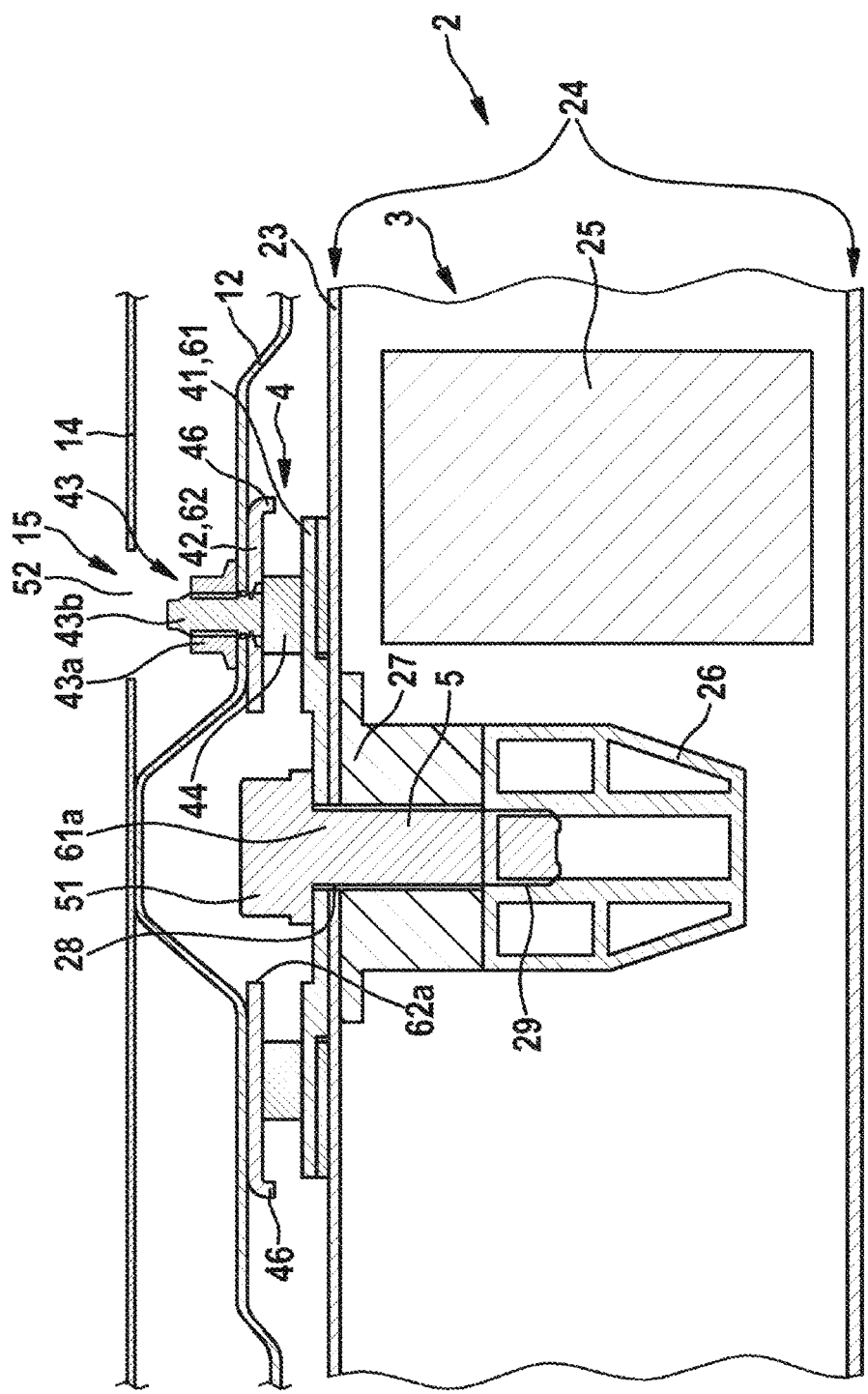
FIG. 2 is a cross sectional view through a securing assembly for the securing of a vehicle battery on a vehicle body by use of an adhesive bond.

FIG. 2 shows a cross section through a cutout view of a motor vehicle with a securing assembly 4 by way of which the vehicle battery 2 is secured by its housing side 23, which may be formed by a housing cover, to the body part 12 of a vehicle body 1. The securing assembly 4 serves for the additional fixation of the vehicle battery 2 to the body part 12 in an inner region spaced apart from the rim of the vehicle battery 2, to which there is no access during an initial assembly of the vehicle battery 2 from a side of the vehicle body 1 facing toward the mounting position of the vehicle battery 2.

A housing 24 of the vehicle battery 2 contains battery cells 25, which are held in a frame with stiffening profiles 26. The housing side 23 is held on the stiffening profile 26 by a first screw connection with a screw 5, which reaches from the outside through a screw opening 28 of the housing side 23 and can be screwed into a corresponding thread 29 of the stiffening profile 26. A spacer sleeve 27 may be provided between the housing side 23 and the stiffening profile 26, which protects the inside of the vehicle battery 2 against penetration of dirt or moisture through the screw opening 28.

On the outside of the housing side 23, a securing element 41 of the securing assembly 4 on the housing side 23 may be arranged and joined to the latter, for example by welding, adhesive bonding or the like. The screw 5 can reach through the securing element 41 and additionally connect the securing element 41 to the housing side 23 of the vehicle battery 2.

A securing device 42 is provided, which is connected to the body part 12 of the vehicle body 1 by a releasable connection 43, such as a screw connection. The screw connection 43 is preferably releasable from the passenger compartment, for example, through a corresponding access opening 15 in a bottom plate 14. For the loosening of the screw connection 43, a screw nut 43a on a screw bolt 43b can be loosened.

In the present exemplary embodiment, the securing element 41 and the securing device 42 are designed as a first and second securing plate 61, 62, which lie opposite each other in the mounted state of the vehicle battery 2, i.e., in its mounting position, while the first securing plate 61 has a continuous opening 61a to receive the screw 5.

Figure 3:
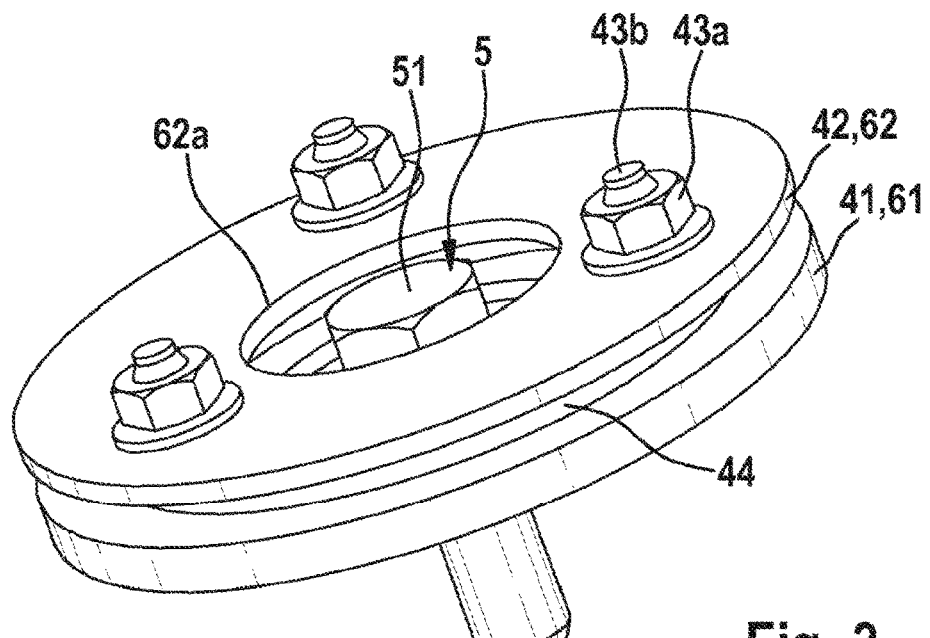
FIG. 3 is a perspective view of the securing assembly of FIG. 1 in an unmounted state.

In the perspective view of FIG. 3, it can be seen that the securing element 41 can be fashioned as a round first securing plate 61, having a continuous opening 61a, which is situated congruent to the screw opening 28 of the vehicle battery 2, so that the screw 5 by its screw head 51 additionally holds the securing element 41 on the stiffening frame 26 of the vehicle battery 2. The second securing plate 62 has an opening 62a in the area of the continuous opening 61a of the first securing plate 61 through which the screw head 51 of the screw 5 is accessible and which can be removed, after a removal of the securing assembly 4 from the vehicle body 1, in order to loosen the securing assembly 4 from the vehicle battery 2.

A connecting device 44 can be provided between the securing element 41 and the securing device 42, which in the present exemplary embodiment can be formed as an adhesive bond. In FIG. 3, the ring-shaped design of both the securing element 41 and the securing device 42 can be seen, the adhesive bond likewise being formed closed and encircling the screw 5. Thus, a dry space can be created by the securing element 41, the securing device 42, the body part 12 of the vehicle body 1 and the adhesive bond 44, which dry space is sealed off by the adhesive bond with respect to the outer surroundings. Thus, in addition, a sealing of the interior of the housing of the vehicle battery 2 against moisture or dirt can be achieved.

The securing assembly 4 depicted makes it possible to mount the vehicle battery 2 in an initial assembly on the vehicle body 1, without the access to the passenger compartment being needed for the mounting of the vehicle battery 2.

Figure 4:
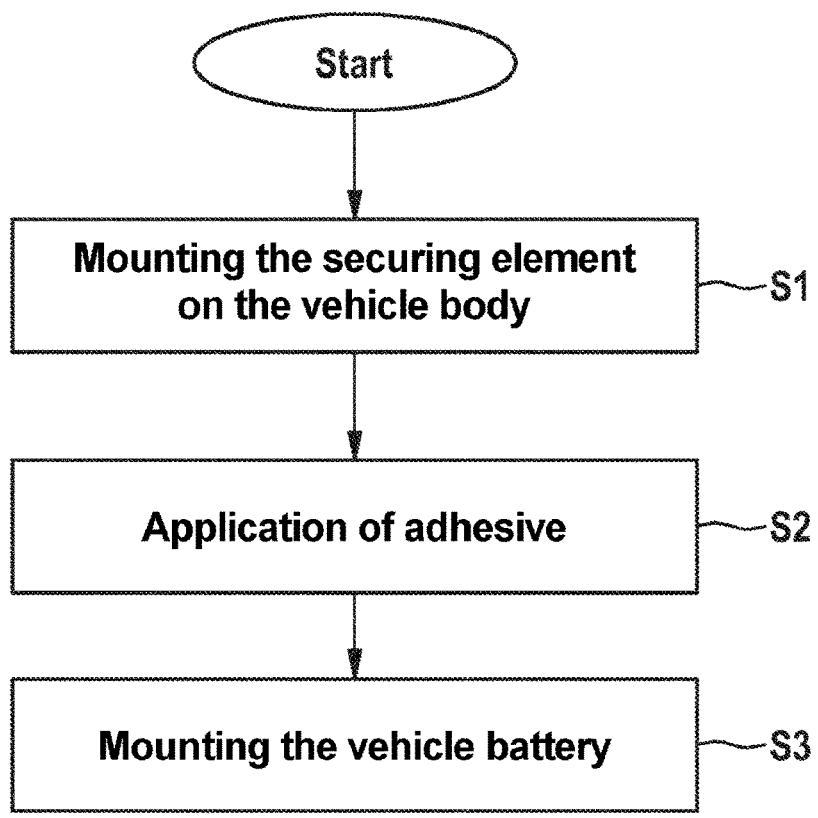
FIG. 4 is a method flow chart illustrating the method steps for the initial assembly of the vehicle battery on the vehicle body.

The assembly steps are represented in FIG. 4 with the aid of a flow chart. First of all, in step S1, the securing device 42 is mounted on the body part 12 of the vehicle body 1. This is done with the aid of a releasable connection 43, especially with the aid of a screw connection 43.

In step S2, in the case of an adhesive bond 43, adhesive is applied if necessary to the securing element 41 or the securing device 42 in such a way that it surrounds the screw head 51 of the screw 5 or a continuous opening in which the screw head 51 is to be received. In the case of securing assemblies 4 which have a form-fitting or force-locking connection being provided between securing element 41 and securing device 42, this step is unnecessary.

In step S3, the vehicle battery 2 provided with the securing element 41 is placed in the mounting position and secured there by screwing the securing flange 21 on the vehicle body 1.

When mounting the vehicle battery 2 on the vehicle body 1, the securing element 41 is pressed against the securing device 42 and in this way a materially bonded, form-fitting or force-locking connection, depending on the type of connecting device, is created with no further action. This makes it possible to avoid vibrations of the body part 12 of the vehicle body 1 and/or the vehicle battery 2.

In the case of an adhesive bond, the securing device 42 may be provided with an outer rim 46 protruding in the direction of the securing element 41 in order to ensure that the initially fluid adhesive does not get outside the area of the securing device 42 when mounting the vehicle battery 2 on the body part 12 of the vehicle body 1 and a direct non-releasable connection between the body part 12 of the vehicle body 1 and the securing assembly 4 or the housing side 23 of the vehicle battery 2 is created.

In order to release the vehicle battery 2 after the initial assembly, the screw connections 43 of the securing device 42 to the body part 12 of the vehicle body 1 can be loosened through an access opening 15 in the bottom plate 14 and thus the entire securing assembly 4 with the vehicle battery 2 can be removed from the vehicle body 1.

Although an adhesive bond for the realization of the connecting device 44 offers an especially good tolerance compensation in regard to tolerances between the securing device 42 and the securing element 41, other kinds of connection between the securing element 41 and the securing device 42 can be provided. For example, FIGS. 5A to 5C show different variants of a form-fitting connection which secure the vehicle battery 2 to the vehicle body 1 without additional mounting actions. Each of the securing devices 42 is connected by a corresponding screw connection (screw 43) to the body part 12, so that the securing device can be removed from the body part 12 by loosening the screw connection from the passenger compartment.

FIG. 5A shows for example a locking by a T-groove 62' as the securing device 42, into which a mushroom head 61' is inserted as the securing element 41. For this, it is necessary to position the vehicle battery 2 in the mounting position by a displacement in the lateral direction on the body part 12 of the vehicle body 1, in order to interlock the mushroom head 61' with the T-groove 62'.

The variants of FIGS. 5B and 5C provide for the securing device 42 in the form of a locking device 62", 62'" being inserted into the securing element 41 in the form of a locking element 61", 61'", which securely interlocks the securing device 42 with the securing element 41 when the vehicle battery is mounted. A loosening of these locking connections is generally not provided, but rather the corresponding locking device 62", 62'" must be released in such a way, via the releasable connection of the vehicle body 1, that the entire securing assembly 4 can be removed with the vehicle battery 2.

LIST OF REFERENCE NUMBERS 1 vehicle body
11 cavity
12 body part
14 bottom plate
15 access opening
2 vehicle battery
21 securing flange
22 screw connections
23 housing side
24 housing
25 battery cells
26 stiffening profile
27 spacer sleeve 28 screw opening
29 thread
4 securing assembly
41 securing element
42 securing device
43 releasable connection
43a screw nut
43b screw bolt
44 connecting device
46 protruding outer rim
5 screw
51 screw head
61, 62 securing plates
61a connecting device
62a opening
61' mushroom head
62' T-groove
61", 61''' locking element
62", 62''' locking device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A securing assembly for securing a vehicle battery on a vehicle body of a vehicle, comprising:
   a securing element that secures to a housing of the vehicle battery;
   a securing device that detachably secures to a body part of the vehicle body, wherein
   the securing element and the securing device are configured so as to be connectable to one another by material bonding, form fitting, or force locking when the vehicle battery is placed in a mounting position, and wherein
   the securing assembly is formed such that, when the vehicle battery is placed in a mounting position on the vehicle body, the securing element is permanently connected to the securing device.

2. The securing assembly according to claim 1, wherein the securing element, which is in a form of a securing plate, has a continuous opening to receive a screw.

3. The securing assembly according to claim 2, wherein the securing device has an opening for an access for loosening the screw.

4. The securing assembly according to claim 3, wherein a connecting device in a form of an adhesive is introduced between the securing element and the securing device.

5. The securing assembly according to claim 4, wherein the adhesive of the connecting device surrounds the continuous opening.

6. The securing assembly according to claim 4, wherein the securing device has an encircling rim protruding in the direction of the securing element on a side where the adhesive is applied.

7. The securing assembly according to claim 1, wherein the securing element is provided with a locking element and the securing device is provided with a locking device, which are interlockable with each other.

8. The securing assembly according to claim 1, wherein the securing device has a device for a screw connection with the vehicle body.

9. The securing assembly according to claim 8, wherein the device is a threaded fastener.

10. A body arrangement, comprising:
    a vehicle body;
    a vehicle battery; and
    a securing assembly for securing the vehicle battery on the vehicle body of a vehicle, comprising:
    a securing element that secures to a housing of the vehicle battery;
    a securing device that detachably secures to a body part of the vehicle body, wherein the securing element and the securing device are configured so as to be connectable to one another by material bonding, form fitting, or force locking when the vehicle battery is placed in a mounting position, which are arranged between a housing side of the vehicle battery and a body part of the vehicle body, wherein
    the securing assembly is formed such that, when the vehicle battery is placed in a mounting position on the vehicle body, the securing element is permanently connected to the securing device.

11. The body arrangement according to claim 10, wherein the securing device is releasably connected to the body part of the vehicle body and the securing element is connected to the housing side of the vehicle battery.

12. The body arrangement according to claim 11, wherein the securing element is connected by a screw connection to a stiffening profile of the vehicle battery.

13. The body arrangement according to claim 11, wherein the securing device is connected by a screw connection to the body part of the vehicle body, and
    the screw connection is releasable from a passenger compartment of the vehicle body.

14. A method for mounting the vehicle battery on the vehicle body using the securing assembly for securing the vehicle battery on the vehicle body of the vehicle according to claim 1, the method comprising the steps of:
    detachably securing the securing device to the body part of the vehicle body;
    securing the securing element to the housing of the vehicle battery; and
    positioning the vehicle battery in the mounting position on the vehicle body, wherein the securing element is permanently connected to the securing device.

15. The method according to claim 14, wherein the vehicle battery is placed in the mounting position on the vehicle body by screwing the vehicle battery to the vehicle body along a securing flange at a housing rim of the vehicle battery.

* * * * *